April 26, 1966  R. M. HARMON  3,247,892
DOOR FOR VEHICLES INCLUDING AIRPLANES
Filed April 25, 1963
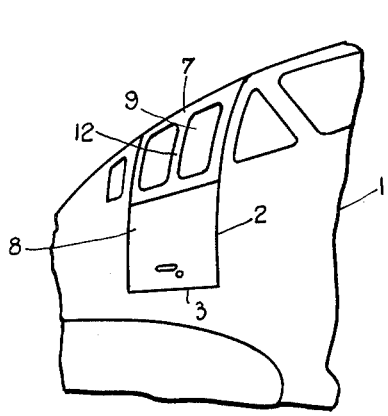
Fig 1
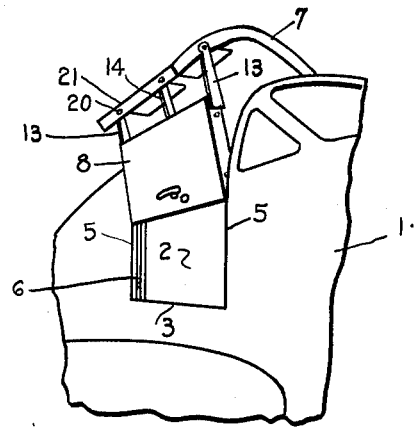
Fig 2
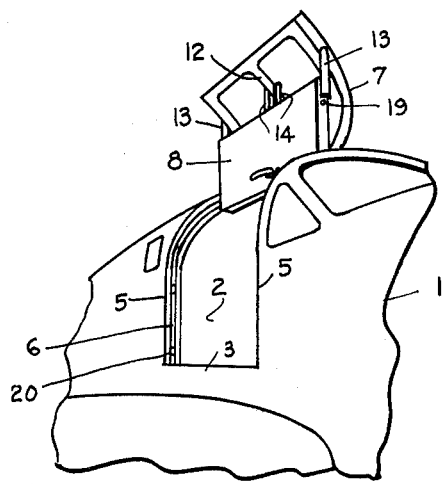
Fig 3
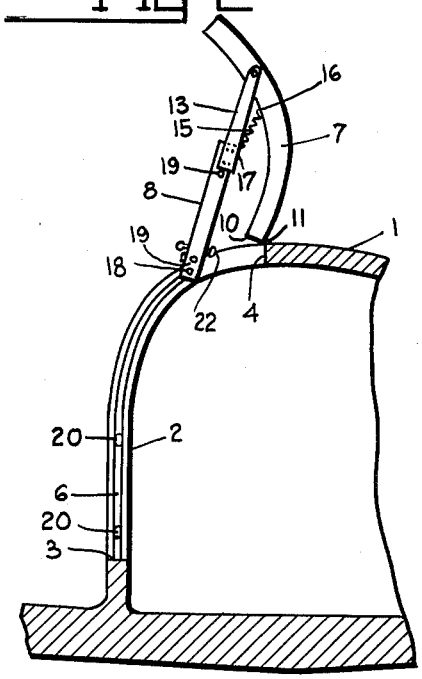
Fig 4
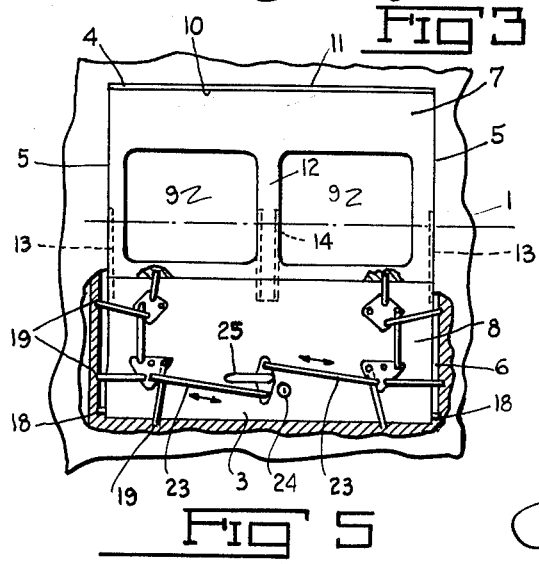
Fig 5
INVENTOR.
RALPH M. HARMON
BY
ATTORNEY United States Patent Office
3,247,892
Patented Apr. 26, 1966

3,247,892
DOOR FOR VEHICLES INCLUDING AIRPLANES
Ralph M. Harmon, Kerrville, Tex., assignor to Mooney Aircraft, Inc., Kerrville, Tex., a corporation of Texas
Filed Apr. 25, 1963, Ser. No. 275,554
5 Claims. (Cl. 160—207)

This invention relates in general to doors for vehicles and primarily to a multiple panel, horizontally hinged and vertically opening door for airplanes, it being understood that the same principles of construction and operation of my door may be utilized for doors for motor launches, sports, racing or other motor vehicles, streamlined trains and the like.

It is known that present day vehicles are provided with vertically opening hinged doors which open downwardly to from steps, or bomb bay doors with double opposed hinged panels, but insofar as I am aware there are no structures employing multiple panels, one of which is hinged to the body of the vehicle with the other panel or panels hinged to each other and provided with means to lock the panels in relation to each other and to the body or fuselage of the airplane whereby the door panels, when locked, will form a structural part of the fuselage or body.

Present day doors, particularly in light planes, are generally hinged along the forward edge of the door, and when the engine is running either on the ground or aloft, it is extremely difficult and dangerous to open the door without affecting the flight characteristics of the airplane. Furthermore, present day doors are generally not designed to contribute must to the strength of the fuselage at the door opening. To the contrary, such openings must be reinforced considerably to offset the loss of strength by the provision of the access door. As airplane designers have endeavored to make their doors wider and wider for greater ease of access this strengthening requirement at the door openings has increased.

With my form of hinged door, door opening width may be increased without materially increasing the necessity for greater reinforcement inasmuch as means are provided for positively locking the door panels to the fuselage at a plurality of points on the perimeter of said door opening.

Further, the manner of hinging of one door panel at the door opening by means of full length piano type hinges makes for added strength.

With the foregoing in mind it is therefore one object of my invention to provide a door for an opening in a vehicle comprising a plurality of body conforming panels with one panel hinged at the opening along the longitudinal axis of the vehicle, the remaining panels being hinged to the first mentioned panel and to each other respectively along axes substantially parallel to each other and to the axis of the first mentioned hinged connection between the first mentioned panel and the vehicle body.

It is another object of my invention to provide a door for an opening in a vehicle comprising at least a pair of body conforming panels, one panel being hinged to the body of the vehicle along an axis substantially parallel to the longitudinal axis of said body, a second panel being hinged to the first mentioned panel along a hinge axis substantially parallel to the axis of the first mentioned hinge, one edge of the second mentioned panel being free to abut an edge of the opening in the body when the door is in closed position.

One more object of the invention is to locate the hinged axis between the second mentioned panel and the first mentioned panel intermediate the bottom and top edge of the first mentioned panel and preferably at a point where the distance between the hinged axis of the second mentioned panel and the first mentioned panel and the hinged edge of the first mentioned panel and the body is less than to the distance between said hinged axis and the free edge of the second mentioned panel.

And still another object of my invention is to make the second mentioned panel of less width than the first mentioned panel and to provide said second mentioned panel with a plurality of hinge arms extending therefrom, said hinge arms being pivotally secured to the first mentioned panel along an axis substantially parallel to the hinge axis of the first mentioned panel and the body of the vehicle.

Another object of my invention is to provide grooves or tracks in the side edges of the door opening to slidably receive pins or other suitable elements secured to the second mentioned panel adjacent the free edge thereof.

One more object of my invention is to so proportion the panels and to locate the hinge axes whereby with the door in fully opened position the hinge axis between the panels will pass through a dead center position to maintain the door in open position.

And another object of my invention is to provide a spring member between the two panels to aid in opening the door and aid in maintaining the panels in open position.

These and other objects as well as the construction and operation of my invention will be better understood by reference to the following description in connection with the accompanying drawing in which:

FIG. 1 is a fragmentary isometric view of an airplane fuselage in which my door is installed, the door being shown in closed position.

FIG. 2 is a similar view with the door in partially opened position.

FIG. 3 is also a similar view with the door in fully opened position.

FIG. 4 is a fragmentary cross sectional view through the fuselage showing the door in fully opened position.

FIG. 5 is a elevational view of the door showing the door locking means, with fragmentary portions of the fuselage and parts being broken away to better illustrate certain other parts.

Referring now to the drawing by numerals of reference, 1 designates a vehicle body—in this case the fuselage of an airplane—provided with a door receiving opening 2 therein.

The opening extends from a bottom sill 3 to upper edge 4 which may be anywhere along the upper periphery of the fuselage and which I have shown in the vicinity of the central longitudinal line of said fuselage. Side edges 5 of the opening follow the contour of the fuselage and may be provided with grooves or tracks 6 for the purpose hereinafter specified.

In one form of my door I have shown an upper panel 7 and a lower panel 8. The upper panel may be provided with one or more windows 9. Upper edge 10 of upper panel 7 may be hinged to the upper edge 4 of the fuselage by means of a full length piano hinge 11 lying substantially parallel to the longitudinal axis of the fuselage at the upper surface thereof. Mullions 12 may be provided when several windows are used in the door.

The lower panel 8, preferably of less width than upper window containing panel 7, is provided at each side with upwardly extending hinge arms 13 shown with an arcuate configuration to conform to the configuration of the fuselage. The lower panel 8 may also be provided with a pair of spaced upwardly extending hinge arms 14, said arms 13 and 14 being hinged to the upper panel 7 on a common longitudinal axis substantially parallel to the hinge line of the piano hinge 11 and to the longitudinal axis of the fuselage, hinge arms 13 being suitably pivoted at the sides of the upper panel 7 and hinge arms 14 being suitably pivoted at the mullion 12.

A spring 15 may be secured to the upper panel 7 at 16 and to the lower panel 8 at 17 and will aid in raising the door panels to open position and further will aid in maintaining the panels in raised position, as shown in FIG. 4, when the hinge axis between the panels has passed through dead center position.

The lower panel 8 is provided with oppositely disposed pins 18 positioned in grooves 6 in the side edges 5 of the door opening 2. This will steady the door panels as they are opened and shut.

It is extremely desirable to lock the door panels to the fuselage and to each other to cause panels 7 and 8 to form a structural part of the fuselage when closed and locked and thereby permit use of a substantially large opening which will not require any great degree of additional reinforcing.

I have shown one means of performing this locking function in which I use a plurality of hook members 19 carried by lower panel 8 and adapted to engage recessed means 20 in the sides and bottom of the door opening 2 and in the lower edge 21 of the upper panel 7, all of said hook members being connected to an interior locking handle 22 through suitable linkage 23. An external key lock 24 may be employed together with a simple external handle 25.

From the foregoing it will be noted that I have provided a multiple panel door for vehicles including airplanes, said door being hinged along axes substantially parallel to the longitudinal axis of the vehicle at the top thereof whereby when the door is in open position the panels of the door will lie parallel to the slipstream of the vehicle and the door, therefore, could be opened when the engine is running on the ground or during flight. Furthermore, entrance and exit from the vehicle are made easy, first, because the door opening can be made quite large by use of my door and second, because the door opening is completely free of the door as the door is out of the way of the person entering the vehicle. This arrangement is extremely helpful for loading cargo or when the vehicle is used as an ambulance. Another important factor is that my door, as constructed, provides a definite structural part of the vehicle when fully closed and this is generally not the case with many types of doors in vehicles.

Obviously, changes in form, proportion and details of construction may be resorted to without departing from the spirit of my invention and I reserve all rights to such changes as come within the scope of these specifications and the claims which follow.

What I claim as new and desire to secure by Letters Patent is:

1. A vertically opening door for an opening in a vehicle body including aircraft, comprising:

at least a pair of body conforming door panels having upper and lower edges, one panel being hinged along its upper edge to the upper surface of the body of the vehicle along an axis substantially parallel to the longitudinal axis of said body, the second panel being hinged to the first-mentioned panel along a second hinge axis substantially parallel to the axis of the first-mentioned hinge, the second panel having a free lower edge oppositely disposed from the second-mentioned hinge axis, said second-mentioned hinge axis being located intermediate the bottom and top edges of the first-mentioned panel at a predetermined position, the distance from the second-mentioned hinge axis to the hinged edge of the first-mentioned panel with the body being less than the distance between the second-mentioned hinge axis and the free edge of the second-mentioned panel, permitting swinging of the panels at the second-mentioned hinge axis between said panels through an arc toward the center longitudinal axis at the top of the vehicle until said second-mentioned hinge axis passes through a dead center position whereby said door panels will be maintained in fully opened position, and a guiding means at each side edge of the opening, guide engaging means on each side edge of the second-mentioned panel, said guide engaging means being in continuous sliding engagement with the guiding means to secure the second-mentioned panel in the opening when in open or closed position in relation to said opening.

2. The structure as specified in claim 1, the upper end of the guiding means terminating at a point lower than the axis of the upper edge of the first-mentioned panel, whereby the lower edge of the second-mentioned panel will be located at a point lower than the upper edge of the first-mentioned panel when the door panels are in fully opened position.

3. The structure as specified in claim 1, in which the hinge axis at the upper edge of the first-mentioned panel is adjacent the central longitudinal axis at the top of the vehicle body.

4. The structure as specified in claim 1, including a spring means between the panels normally urging said panels toward fully open position, and the hinge axis between the panels into position past dead center.

5. The structure as specified in claim 1, locking means between the panels, and manual means for moving said locking means into and out of engagement with the body and with the panels to secure the door panels to each other and to the body in closed position and between the panels and the body of the vehicle.

References Cited by the Examiner

UNITED STATES PATENTS

| | | | |
|---|---|---|---|
| 719,758 | 2/1903 | Custer | 160—207 |
| 1,209,360 | 12/1916 | Tomkinson | 160—207 |
| 1,453,550 | 5/1923 | Fogal | 160—188 |
| 1,481,239 | 1/1924 | Folland | 160—192 |
| 1,562,600 | 11/1924 | Taylor | 160—190 |
| 2,334,749 | 11/1943 | Burr | 160—192 |
| 2,366,793 | 1/1945 | Kuehner | 160—207 |
| 2,763,900 | 9/1956 | McAfee et al. | 244—129 |
| 2,797,884 | 7/1957 | Peed | 244—129 |
| 2,893,482 | 7/1959 | Burgin | 160—207 |

HARRISON R. MOSELEY, *Primary Examiner.*

REINALDO P. MACHADO, *Examiner.*